United States Patent
Takagi et al.

(10) Patent No.: US 6,396,926 B1
(45) Date of Patent: May 28, 2002

(54) SCHEME FOR FAST REALIZATION OF ENCRYTION, DECRYPTION AND AUTHENTICATION

(75) Inventors: Tsuyoshi Takagi; Shozo Naito, both of Tokyo (JP)

(73) Assignee: Nippon Telegraph & Telephone Corporation, Tokyo (JP)

( * ) Notice: Subject to any disclaimer, the term of this patent is extended or adjusted under 35 U.S.C. 154(b) by 0 days.

(21) Appl. No.: 09/280,150

(22) Filed: Mar. 26, 1999

(30) Foreign Application Priority Data

Mar. 26, 1998 (JP) ............................................. 10-079836
Aug. 21, 1998 (JP) ............................................. 10-236084

(51) Int. Cl.$^7$ ................................................. H04B 9/28
(52) U.S. Cl. ............................ 380/28; 380/28; 380/30; 708/492; 708/606
(58) Field of Search ...................... 380/30, 28; 708/606, 708/492

(56) References Cited

U.S. PATENT DOCUMENTS

| | | | | |
|---|---|---|---|---|
| 4,405,829 A | * | 9/1983 | Rivest et al. | 178/22 |
| 5,761,310 A | * | 6/1998 | Naciri | 380/30 |
| 5,848,159 A | * | 12/1998 | Collins et al. | 380/30 |

FOREIGN PATENT DOCUMENTS

| | | |
|---|---|---|
| JP | 58 190 151 | 7/1983 |
| JP | 11 174 955 | 2/1999 |

OTHER PUBLICATIONS

Menezes et al, Handbook of Applied Cryptography, 10/96, pp. 89, 612, 613.*

Schneier, Applied Cryptography, 2nd ed., 10/95, pp. 470.*

Quisquater, Fast Decipherment Algorithm for RSA Public–Key Cryptosystem, 10/82, Electronic Letters vol. 18, No. 21, pp. 905–907.*

S. A. Vanstone and R. J. Zuccherato, "Using Four–Prime RSA In Which Some of the Bits are Specified" *Electronics Letters*, vol. 30, No. 25, pp. 2118, 2119, Dec. 8, 1994.

Tsuyoshi Takagi, "Fast RSA–Type Cryptosystem Modulo $p^k q$", Lecture Notes in Computer Science, Advances in Cryptology—CRYPTO 98; 18$^{th}$ Annual International Cryptology Conference, Aug. 1998; pp. 318–326.

Tatsuaki Okamoto, "A Fast Signature Scheme Based on Congruential Polynomial Operations"; *IEEE Transactions on Information Theory*; Jan. 1990, Vol. 36, pp. 47–53.

Fast RSA–type cryptosystems using n–adic expansion, Tsuyoshi Takagi, NTT Software Laboratories.

*Communications of the ACM*, Feb. 1978, vol. 21, No. 2 (pp. 121–126).

* cited by examiner

*Primary Examiner*—Gilberto Barron, Jr.
*Assistant Examiner*—James Seal
(74) *Attorney, Agent, or Firm*—Kilpatrick Stockton LLP

(57) ABSTRACT

A new scheme for fast realization of encryption, decryption and authentication which can overcome the problems of the RSA cryptosystem is disclosed. The encryption obtains a ciphertext C from a plaintext M according to $C \equiv M^e \pmod{n}$ using a first secret key given by N ($\geq 2$) prime numbers $p_1, p_2, \ldots, p_N$, a first public key n given by a product $p_1^{k1} p_2^{k2} \ldots p_N^{kN}$ where k1, k2, ..., kN are arbitrary positive integers, a second public key e and a second secret key d which satisfy $ed \equiv 1 \pmod{L}$ where L is a least common multiple of $p_1-1, p_2-1, \ldots, p_N-1$. The decryption recovers the plaintext M by obtaining residues $M_{p1k1}, M_{p2k2}, \ldots, M_{pNkN}$ modulo $p_1^{k1}, p_2^{k2}, \ldots, p_N^{kN}$, respectively, of the plaintext M using a prescribed loop calculation with respect to the first secret key $p_1, p_2, \ldots, p_N$, and by applying the Chinese remainder theorem to the residues $M_{p1k1}, M_{p2k2}, \ldots, M_{pNkN}$. This encryption/decryption scheme can be utilized for realizing the authentication.

14 Claims, 5 Drawing Sheets

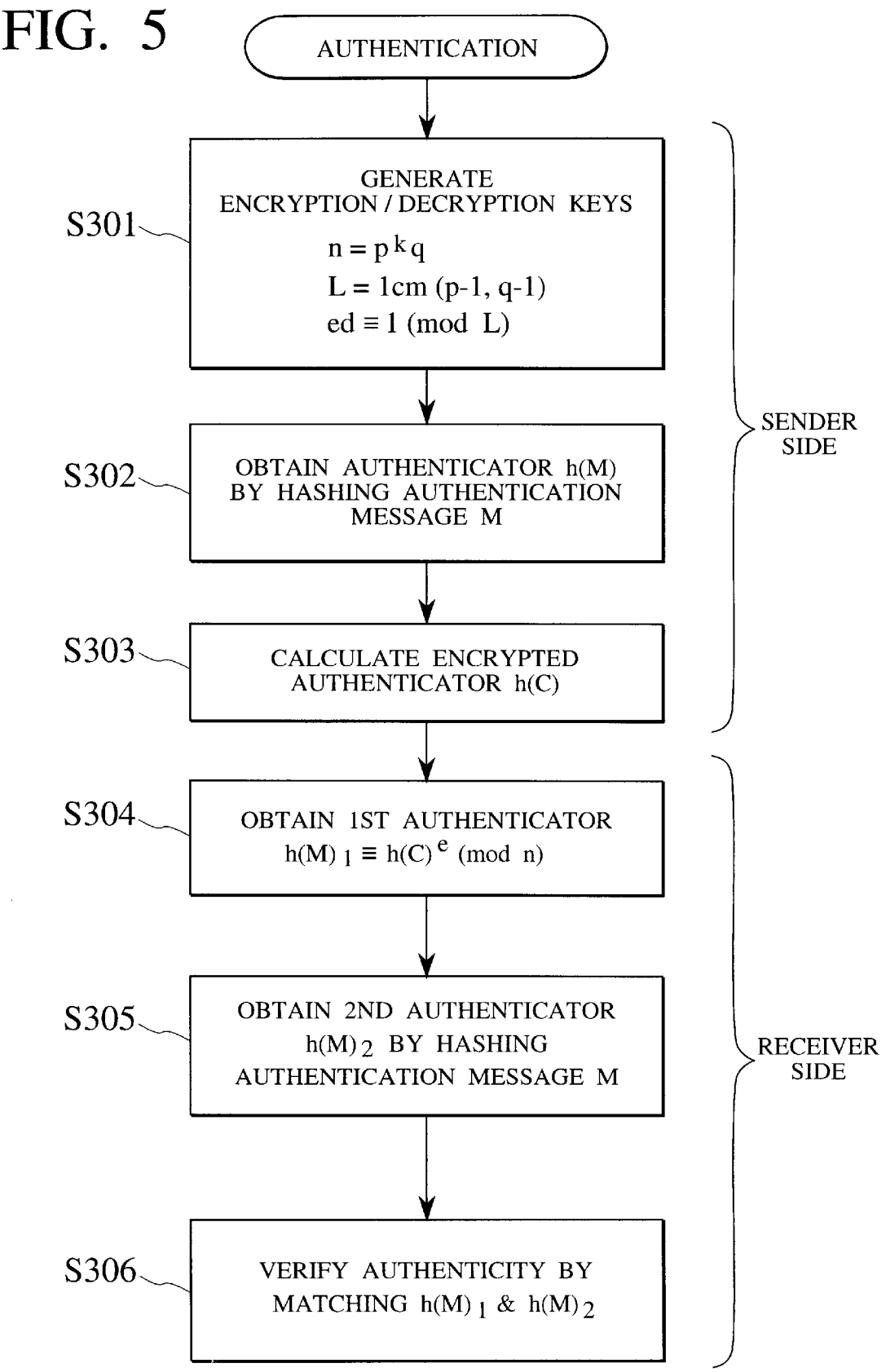

SCHEME FOR FAST REALIZATION OF ENCRYTION, DECRYPTION AND AUTHENTICATION

BACKGROUND OF THE INVENTION

1. Field of the Invention

The present invention relates to a scheme for fast realization of encryption, decryption and authentication which is suitable for data concealment and communicating individual authentication in communications for a digital TV, a pay-per-view system of the satellite broadcast, a key distribution in the information distribution, electronic mails, electronic transactions, etc.

2. Description of the Background Art

In recent years, in the field of communications, various types of cryptographic techniques have been proposed because the cryptographic technique can be effectively used for the protection of secrecy between communicating parties such as the concealment of information to be transmitted. The performances of such a cryptographic technique can be evaluated in terms of the security level of cryptosystem and the speed of encryption/decryption. Namely, the cryptosystem for which the security level is high and the encryption/decryption speed is high is a superior cryptosystem.

Among such cryptographic techniques, there is a type of public key cryptosystem that uses the modular exponent calculations, known as RSA (Rivest Shamir Adleman) cryptosystem, which is already in practical use. In this RSA cryptosystem, it has been shown that the plaintext can be obtained from the ciphertext if the prime factoring of the public key can be made (see R. Rivest, A. Shamir and L. Adleman; "A method for obtaining digital signatures and public-key cryptosystems", Comm. ACM, Vol. 21, No. 2, pp. 120–126 (1978)).

The public key cryptosystem such as RSA cryptosystem has its security based on the computational difficulty for obtaining the secret key from the public key which is a publicly disclosed information, so that the security level can be increased as much when a size of the public key is increased. On the other hand, the RSA cryptosystem has been associated with a drawback that it requires a considerable amount of time for encryption/decryption because it carries out higher degree modular exponent calculations and therefore the required amount of calculations is large.

The encryption/decryption can be made faster by reducing the degree of the modular exponent calculations, for example, but that will require the reduction of the size of the public key and that in turn causes the lowering of the cryptosystem security.

In the following, the RSA cryptosystem will be described in further detail.

First, mutually different arbitrary prime numbers p and q are set as the first secret key, and the first public key n is obtained as:

$$n=pq$$

while the least common multiple L of (p-1) and (q-1) is obtained as:

$$L=1\ \text{cm}(p-1,\ q-1).$$

Then, an arbitrary integer e is set as the second public key, and the second secret key d given by:

$$ed \equiv 1 (\bmod L)$$

is obtained using the Euclidean division algorithm.

Then, a plaintext M and its ciphertext C can be expressed as follow:

$$C \equiv M^e (\bmod n),$$

$$M \equiv C^d (\bmod n).$$

Here, the value of the second public key e can be rather small like 13, for instance, so that the encryption processing can be made very fast, but the value of the second secret key d has a size nearly equal to n so that the decryption processing will be quite slow.

On the other hand, the processing amount of the modular exponent calculations is proportional to the cube of the size of a number, so that by utilizing this property, the Chinese remainder theorem can be used in order to make the decryption processing faster.

The decryption processing using the Chinese remainder theorem proceeds as follows.

$$d_p \equiv d(\bmod p-1),$$

$$d_q \equiv d(\bmod q-1),$$

$$uq \equiv 1(\bmod p),$$

$$M_p \equiv C^{d_p}(\bmod p),$$

$$M_q \equiv C^{d_q}(\bmod q),$$

$$M \equiv ((M_p - M_q)u(\bmod p))q + M_q,$$

where u is an inverse of q modulo p.

Here, the size of each of p, q, $d_p$ and $d_q$ is a half of the size of n so that the modular exponent calculations module p or q can be processed eight times faster, and as a result, the decryption processing as a whole can be made four times faster.

Also, the RSA cryptosystem can be easily cryptoanalyzed if the prime factoring of n can be made. Currently, the potentially threatening prime factoring algorithms include the number field sieve method and the elliptic curve method.

The required amount of calculations is of a quasi-exponential order of the size of n in the number field sieve method and of a quasi-exponential order of the size of a prime number in the elliptic curve method. The elliptic curve method is practically not a problem because of its high order calculations and large coefficients. On the other hand, the number field sieve method has a record for the prime factoring of the largest number realized so far, which is about 140 figures in decimal. Consequently, attacks using these methods are not threatening in practice if n is 1024 bits or so.

In addition, there are cases where a public key cryptosystem apparatus can be used as an authentication apparatus by reversing the public key and secret key calculations in general.

SUMMARY OF THE INVENTION

It is therefore an object of the present invention to provide a new scheme for encryption, decryption and authentication which is capable of overcoming the problems associated with the conventionally known RSA cryptosystem as described above.

More specifically, objects of the present invention are:

(1) to realize an encryption/decryption scheme which has the same security level compared with the known RSA cryptosystem on rational integer ring, (2) to realize an encryption/decryption scheme for which the encryption/decryption processing is faster than the conventional RSA cryptosystem, (3) to realize an encryption/decryption scheme which can also be utilized as an authentication scheme such that a single apparatus can be used for both the cipher communications and the authentication, and (4) to realize an authentication scheme for which the authenticator generation and the verification are faster than the known authentication scheme based on the conventional RSA cryptosystem.

According to one aspect of the present invention there is provided an encryption method, comprising the steps of: setting N ($\geq 2$) prime numbers $p_1, p_2, \ldots, p_N$ as a first secret key, and a product $p_1^{k1} p_2^{k2} \ldots p_N^{kN}$ as a first public key n, where $k1, k2, \ldots, kN$ are arbitrary positive integers; determining a second public key e and a second secret key d which satisfy:

$$ed \equiv 1 \pmod{L}$$

where L is a least common multiple of $p_1-1, p_2-1, \ldots, p_N-1$, using the first secret key; and obtaining a ciphertext C from a plaintext M according to:

$$C \equiv M^e \pmod{n}$$

using the first public key n and the second public key e.

According to another aspect of the present invention there is provided a decryption method for decrypting a ciphertext C obtained from a plaintext M according to:

$$C \equiv M^e \pmod{n}$$

using a first secret key given by N ($\geq 2$) prime numbers $p_1, p_2, \ldots, p_N$, a first public key n given by a product $p_1^{k1} p_2^{k2} \ldots p_N^{kN}$ where $k1, k2, \ldots, kN$ are arbitrary positive integers, a second public key e and a second secret key d which satisfy:

$$ed \equiv 1 \pmod{L}$$

where L is a least common multiple of $p_1-1, p_2-1, \ldots, p_N-1$, the method comprising the steps of: obtaining residues $M_{p1k1}, M_{p2k2}, \ldots, M_{pNkN}$ modulo $p_1^{k1}, p_2^{k2}, \ldots, p_N^{kN}$ respectively, of the plaintext M using a prescribed loop calculation with respect to the first secret key $p_1, p_2, \ldots, p_N$; and recovering the plaintext M by applying Chinese remainder theorem to the residues $M_{p1k1}, M_{p2k2}, \ldots, M_{pNkN}$.

According to another aspect of the present invention there is provided an authentication method for authenticating an authentication message sent from a sender to a receiver, comprising the steps of: (a) setting at the sender side a first secret key given by N ($\geq 2$) prime numbers $p_1, p_2, \ldots, p_N$, a first public key n given by a product $p_1^{k1} p_2^{k2} \ldots p_N^{kN}$ where $k1, k2, \ldots, kN$ are arbitrary positive integers, a second public key e and a second secret key d which satisfy:

$$ed \equiv 1 \pmod{L}$$

where L is a least common multiple of $p_1-1, p_2-1, \ldots, p_N-1$; (b) obtaining at the sender side an authenticator h(M) by hashing the authentication message M using a hash function h; (c) obtaining at the sender side an encrypted authenticator S of the authenticator h(M) according to:

$$h(M) \equiv S^e \pmod{n}$$

by obtaining residues $S_{p1k1}, S_{p2k2}, \ldots, S_{pNkN}$ modulo $p_1^{k1}, p_2^{k2}, \ldots, p_N^{kN}$, respectively, of the encrypted authenticator S using a prescribed loop calculation with respect to the first secret key $p_1, p_2, \ldots, p_N$, and applying Chinese remainder theorem to the residues $S_{p1k1}, S_{p2k2}, \ldots, S_{pNkN}$; (d) sending the encrypted authenticator S and the authentication message M from the sender to the receiver; (e) obtaining at the receiver side a first authenticator $h(M)_1$ by calculating $S^e \pmod{n}$ from the encrypted authenticator S received from the sender using the second public key e; (f) obtaining at the receiver side a second authenticator $h(M)_2$ by hashing the authentication message M received from the sender using the hash function h; and (g) judging an authenticity of the authentication message M at the receiver side by checking whether the first authenticator $h(M)_1$ and the second authenticator $h(M)_2$ coincide or not.

According to another aspect of the present invention there is provided an encryption apparatus, comprising: an encryption/decryption key generation processing unit for setting N ($\geq 2$) prime numbers $p_1, p_2, \ldots, p_N$ as a first secret key, and a product $p_1^{k1} p_2^{k2} \ldots p_N^{kN}$ as a first public key n, where $k1, k2, \ldots, kN$ are arbitrary positive integers, and determining a second public key e and a second secret key d which satisfy:

$$ed \equiv 1 \pmod{L}$$

where L is a least common multiple of $p_1-1, p_2-1, \ldots, p_N-1$, using the first secret key; and an encryption processing unit for obtaining a ciphertext C from a plaintext M according to:

$$C \equiv M^e \pmod{n}$$

using the first public key n and the second public key e.

According to another aspect of the present invention there is provided a decryption apparatus for decrypting a ciphertext C obtained from a plaintext M according to:

$$C \equiv M^e \pmod{n}$$

using a first secret key given by N ($\geq 2$) prime numbers $p_1, p_2, \ldots, p_N$, a first public key n given by a product $p_1^{k1} p_2^{k2} \ldots p_N^{kN}$ where $k1, k2, \ldots, kN$ are arbitrary positive integers, a second public key e and a second secret key d which satisfy:

$$ed \equiv 1 \pmod{L}$$

where L is a least common multiple of $p_1-1, p_2-1, \ldots, p_N-1$, the apparatus comprising: a calculation processing unit for obtaining residues $M_{p1k1}, M_{p2k2}, \ldots, M_{pNkN}$ modulo $p_1^{k1}, p_2^{k2}, \ldots, p_N^{kN}$, respectively, of the plaintext M using a prescribed loop calculation with respect to the first secret key $p_1, p_2, \ldots, p_N$; and a decryption processing unit for recovering the plaintext M by applying Chinese remainder theorem to the residues $M_{p1k1}, M_{p2k2}, \ldots, M_{pNkN}$.

According to another aspect of the present invention there is provided a cipher communication system, comprising: a sender apparatus having: an encryption/decryption key generation processing unit for setting N ($\geq 2$) prime numbers $p_1, p_2, \ldots, p_N$ as a first secret key, and a product $p_1^{k1} p_2^{k2} \ldots p_N^{kN}$ as a first public key n, where $k1, k2, \ldots, kN$ are arbitrary positive integers, and determining a second public key e and a second secret key d which satisfy:

$$ed \equiv 1 \pmod{L}$$

where L is a least common multiple of $p_1-1, p_2-1, \ldots, p_N-1$, using the first secret key; and an encryption processing unit for obtaining a ciphertext C from a plaintext M according to:

$$C \equiv M^e (\bmod\ n)$$

using the first public key n and the second public key e; and a receiver apparatus having: a calculation processing unit for obtaining residues $M_{p1k1}, M_{p2k2}, \ldots, M_{pNkN}$ modulo $p_1^{k1}, p_2^{k2}, \ldots, p_N^{kN}$ respectively, of the plaintext M using a prescribed loop calculation with respect to the first secret key $p_1, p_2, \ldots, p_N$; and a decryption processing unit for recovering the plaintext M by applying Chinese remainder theorem to the residues $M_{p1k1}, M_{p2k2}, \ldots, M_{pNkN}$.

According to another aspect of the present invention there is provided an authentication message sender apparatus for use in authenticating an authentication message sent from a sender to a receiver, the apparatus comprising: an encryption/decryption key generation processing unit for setting at the sender side a first secret key given by N ($\geq 2$) prime numbers $p_1, p_2, \ldots, p_N$, a first public key n given by a product $p_1^{k1} p_2^{k2} \ldots p_N^{kN}$ where k1, k2, ..., kN are arbitrary positive integers, a second public key e and a second secret key d which satisfy:

$$ed \equiv 1 (\bmod\ L)$$

where L is a least common multiple of $p_1-1, p_2-1, \ldots, p_N-1$; an authentication message hashing processing unit for obtaining at the sender side an authenticator h(M) by hashing the authentication message M using a hash function h; and an authenticator encryption processing unit for obtaining at the sender side an encrypted authenticator S of the authenticator h(M) according to:

$$h(M) \equiv S^e (\bmod\ n)$$

by obtaining residues $S_{p1k1}, S_{p2k2}, \ldots, S_{pNkN}$ modulo $p_1^{k1}, p_2^{k2}, \ldots, p_N^{kN}$, respectively, of the encrypted authenticator S using a prescribed loop calculation with respect to the first secret key $p_1, p_2, \ldots, p_N$, and applying Chinese remainder theorem to the residues $S_{p1k1}, S_{p2k2}, \ldots, S_{pNkN}$, and then sending the encrypted authenticator S and the authentication message M to the receiver.

According to another aspect of the present invention there is provided an authentication message receiver apparatus for use in authenticating an authentication message sent from a sender to a receiver, using a first secret key given by N ($\geq 2$) prime numbers $p_1, p_2, \ldots, p_N$, a first public key n given by a product $p_1^{k1} p_2^{k2} \ldots p_N^{kN}$ where k1, k2, ..., kN are arbitrary positive integers, a second public key e and a second secret key d which satisfy:

$$ed \equiv 1 (\bmod\ L)$$

where L is a least common multiple of $p_1-1, p_2-1, \ldots, p_N-1$, the apparatus comprising: an authenticator decryption processing unit for obtaining a first authenticator $h(M)_1$ by calculating $S^e$ (mod n) from an encrypted authenticator S received from the sender using the second public key e; an authentication message hashing processing unit for obtaining a second authenticator $h(M)_2$ by hashing an authentication message M received from the sender using a hash function h; and an authenticity verification processing unit for judging an authenticity of the authentication message M at the receiver side by checking whether the first authenticator $h(M)_1$ and the second authenticator $h(M)_2$ coincide or not.

According to another aspect of the present invention there is provided an authentication system for authenticating an authentication message sent from a sender to a receiver, the system comprising: a sender apparatus having: an encryption/decryption key generation processing unit for setting at the sender side a first secret key given by N ($\geq 2$) prime numbers $p_1, p_2, \ldots, p_N$, a first public key n given by a product $p_1^{k1} p_2^{k2} \ldots p_N^{kN}$ where k1, k2, ..., kN are arbitrary positive integers, a second public key e and a second secret key d which satisfy:

$$ed \equiv 1 (\bmod\ L)$$

where L is a least common multiple of $p_1-1, p_2-1, \ldots, p_N-1$; an authentication message hashing processing unit for obtaining at the sender side an authenticator h(M) by hashing the authentication message M using a hash function h; and an authenticator encryption processing unit for obtaining at the sender side an encrypted authenticator S of the authenticator h(M) according to:

$$h(M) \equiv S^e (\bmod\ n)$$

by obtaining residues $S_{p1k1}, S_{p2k2}, \ldots, S_{pNkN}$ modulo $p_1^{k1}, p_2^{k2}, \ldots, p_N^{kN}$, respectively, of the encrypted authenticator S using a prescribed loop calculation with respect to the first secret key $p_1, p_2, \ldots, p_N$, and applying Chinese remainder theorem to the residues $S_{p1k1}, S_{p2k2}, \ldots, S_{pNkN}$, and then sending the encrypted authenticator S and the authentication message M to the receiver; and a receiver apparatus having: an authenticator decryption processing unit for obtaining a first authenticator $h(M)_1$ by calculating $S^e$ (mod n) from the encrypted authenticator S received from the sender using the second public key e; an authentication message hashing processing unit for obtaining a second authenticator $h(M)_2$ by hashing the authentication message M received from the sender using the hash function h; and an authenticity verification processing unit for judging an authenticity of the authentication message M by checking whether the first authenticator $h(M)_1$ and the second authenticator $h(M)_2$ coincide or not.

According to another aspect of the present invention there is provided a computer usable medium having computer readable program code means embodied therein for causing a computer to function as an encryption apparatus, the computer readable program code means includes: first computer readable program code means for causing said computer to set N ($\geq 2$) prime numbers $p_1, p_2, \ldots, p_N$ as a first secret key, and a product $p_1^{k1} p_2^{k2} \ldots p_N^{kN}$ as a first public key n, where k1, k2, ..., kN are arbitrary positive integers, and determining a second public key e and a second secret key d which satisfy:

$$ed \equiv 1 (\bmod\ L)$$

where L is a least common multiple of $p_1-1, p_2-1, \ldots, p_N-1$, using the first secret key; and second computer readable program code means for causing said computer to obtain a ciphertext C from a plaintext M according to:

$$C \equiv M^e (\bmod\ n)$$

using the first public key n and the second public key e.

According to another aspect of the present invention there is provided a computer usable medium having computer readable program code means embodied therein for causing a computer to function as a decryption apparatus for decrypting a ciphertext C obtained from a plaintext M according to:

$$C \equiv M^e (\bmod\ n)$$

using a first secret key given by N ($\geq 2$) prime numbers $p_1$, $p_2, \ldots, p_N$, a first public key n given by a product $p_1^{k1} p_2^{k2} \ldots p_N^{kN}$ where k1, k2, ..., kN are arbitrary positive integers, a second public key e and a second secret key d which satisfy:

$$ed \equiv 1 (\bmod L)$$

where L is a least common multiple of $p_1-1, p_2-1, \ldots, p_N-1$, the computer readable program code means includes: first computer readable program code means for causing said computer to obtain residues $M_{p1k1}, M_{p2k2}, \ldots, M_{pNkN}$ modulo $p_1^{k1}, p_2^{k2}, \ldots, p_N^{kN}$, respectively, of the plaintext M using a prescribed loop calculation with respect to the first secret key $p_1, p_2, \ldots, p_N$; and second computer readable program code means for causing said computer to recover the plaintext M by applying Chinese remainder theorem to the residues $M_{p1k1}, M_{p2k2}, \ldots, M_{pNkN}$.

According to another aspect of the present invention there is provided a computer usable medium having computer readable program code means embodied therein for causing a computer to function as an authentication message sender apparatus for use in authenticating an authentication message sent from a sender to a receiver, the computer readable program code means includes: first computer readable program code means for causing said computer to set at the sender side a first secret key given by N ($\geq 2$) prime numbers $p_1, p_2, \ldots, p_N$, a first public key n given by a product $p_1^{k1} p_2^{k2} \ldots p_N^{kN}$ where k1, k2, ..., kN are arbitrary positive integers, a second public key e and a second secret key d which satisfy:

$$ed \equiv 1 (\bmod L)$$

where L is a least common multiple of $p_1-1, p_2-1, \ldots, p_N-1$; second computer readable program code means for causing said computer to obtain at the sender side an authenticator h(M) by hashing the authentication message M using a hash function h; and third computer readable program code means for causing said computer to obtain at the sender side an encrypted authenticator S of the authenticator h(M) according to:

$$h(M) \equiv S^e (\bmod n)$$

by obtaining residues $S_{p1k1}, S_{p2k2}, \ldots, S_{pNkN}$ modulo $p_1^{k1}, p_2^{k2}, \ldots, p_N^{kN}$, respectively, of the encrypted authenticator S using a prescribed loop calculation with respect to the first secret key $p_1, p_2, \ldots, p_N$, and applying Chinese remainder theorem to the residues $S_{p1k1}, S_{p2k2}, \ldots, S_{pNkN}$, and then sending the encrypted authenticator S and the authentication message M to the receiver.

According to another aspect of the present invention there is provided a computer usable medium having computer readable program code means embodied therein for causing a computer to function as an authentication message receiver apparatus for use in authenticating an authentication message sent from a sender to a receiver, using a first secret key given by N ($\geq 2$) prime numbers $p_1, p_2, \ldots, p_N$, a first public key n given by a product $p_1^{k1} p_2^{k2} \ldots p_N^{kN}$ where k1, k2, ..., kN are arbitrary positive integers, a second public key e and a second secret key d which satisfy:

$$ed \equiv 1 (\bmod L)$$

where L is a least common multiple of $p_1-1, p_2-1, \ldots, p_N-1$, the computer readable program code means includes: first computer readable program code means for causing said computer to obtain a first authenticator $h(M)_1$ by calculating $S^e (\bmod n)$ from an encrypted authenticator S received from the sender using the second public key e; second computer readable program code means for causing said computer to obtain a second authenticator $h(M)_2$ by hashing an authentication message M received from the sender using a hash function h; and third computer readable program code means for causing said computer to judge an authenticity of the authentication message M at the receiver side by checking whether the first authenticator $h(M)_1$ and the second authenticator $h(M)_2$ coincide or not.

Other features and advantages of the present invention will become apparent from the following description taken in conjunction with the accompanying drawings.

BRIEF DESCRIPTION OF THE DRAWINGS

FIG. 5 is a flow chart for an authentication processing in the authentication system of FIG. 4.

DETAILED DESCRIPTION OF THE PREFERRED EMBODIMENTS

Referring now to FIG. 1 to FIG. 4, one embodiment of the scheme for encryption, decryption and authentication according to the present invention will be described in detail.

Note that the encryption/decryption scheme of the present invention is realizable using $n = p_1^{k1} p_2^{k2} \ldots p_N^{kN}$ in general, as will be described below, but the more practical exemplary case of using $n = p_1^{k1} p_2$ will be described first. In the following, an expression "$p^k q$" corresponds to a special case of the general expression $p_1^{k1} p_2^{k2} \ldots p_N^{kN}$ (where $p_1, p_2, \ldots, p_N$ are N ($\geq 2$) prime numbers) with N=2, $p_1=p$, $p_2=q$, k1=k and k2=1.

Figure 1:
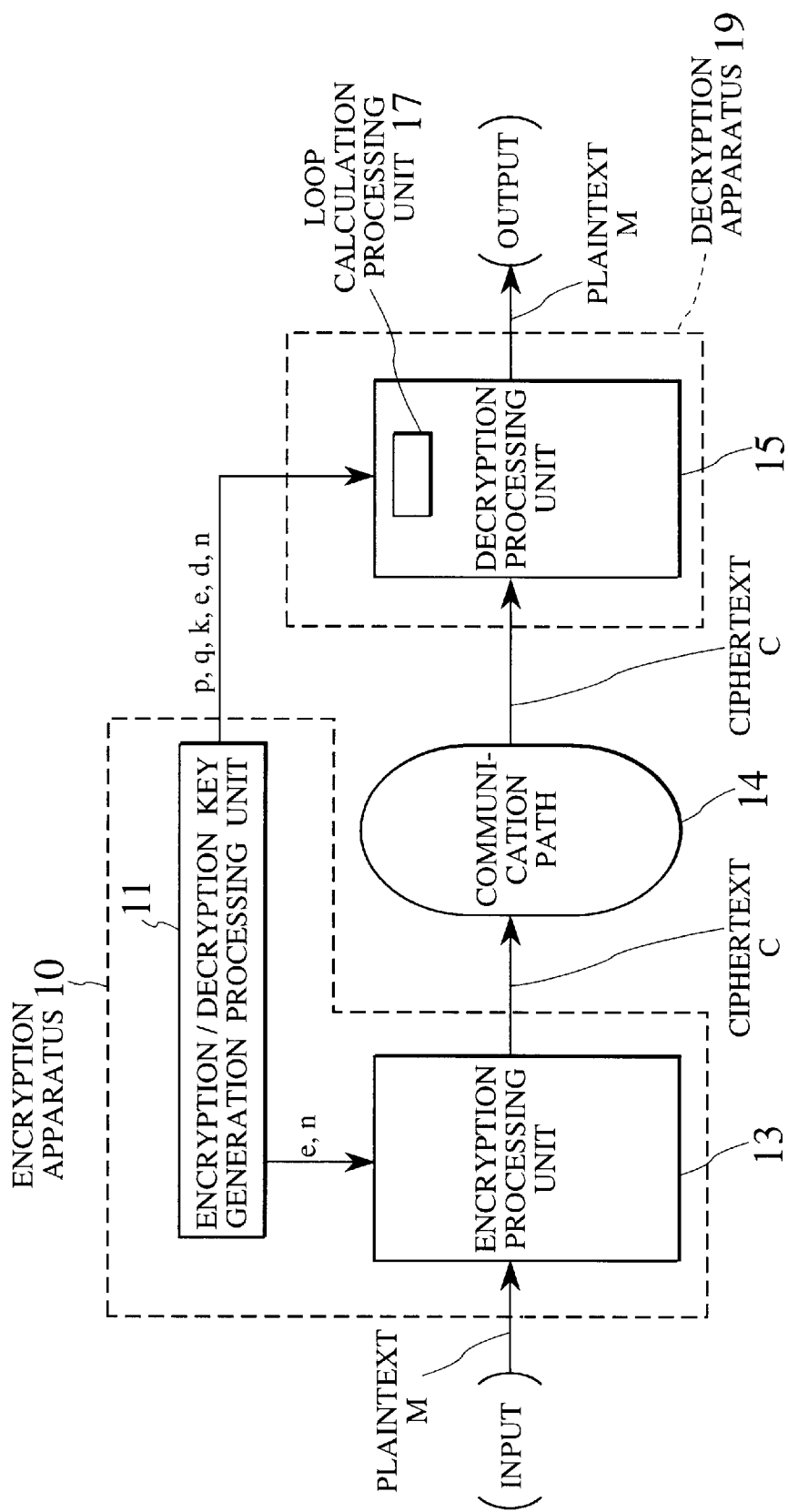
FIG. 1 is a block diagram of a cipher communication system according to one embodiment of the present invention.

FIG. 1 shows an overall configuration of a cipher communication system according to one embodiment of the present invention.

The cipher communication system of FIG. 1 generally comprises an encryption apparatus 10 and a decryption apparatus 19 which are connected through a communication path 14. The encryption apparatus 10 has an encryption processing unit 13 for obtaining a ciphertext C from a plaintext M given as its input, and transmitting the obtained ciphertext C to the decryption apparatus 19 through the communication path 14. The decryption apparatus 19 has a decryption processing unit 15 for recovering the plaintext M from the ciphertext C transmitted by the encryption processing unit 13, and outputting the obtained plaintext M as its output. This decryption processing unit 15 includes a loop calculation processing unit 17.

In addition, the encryption apparatus 10 also has an encryption/decryption key generation processing unit 11 connected with both the encryption processing unit 13 and the decryption processing unit 15, for supplying the first public key n and the second public key e to the encryption processing unit 13 while supplying the first secret key p, q, the second secret key d, an arbitrary positive integer k, the first public key n and the second public key e to the decryption processing unit 15.

Figure 2:
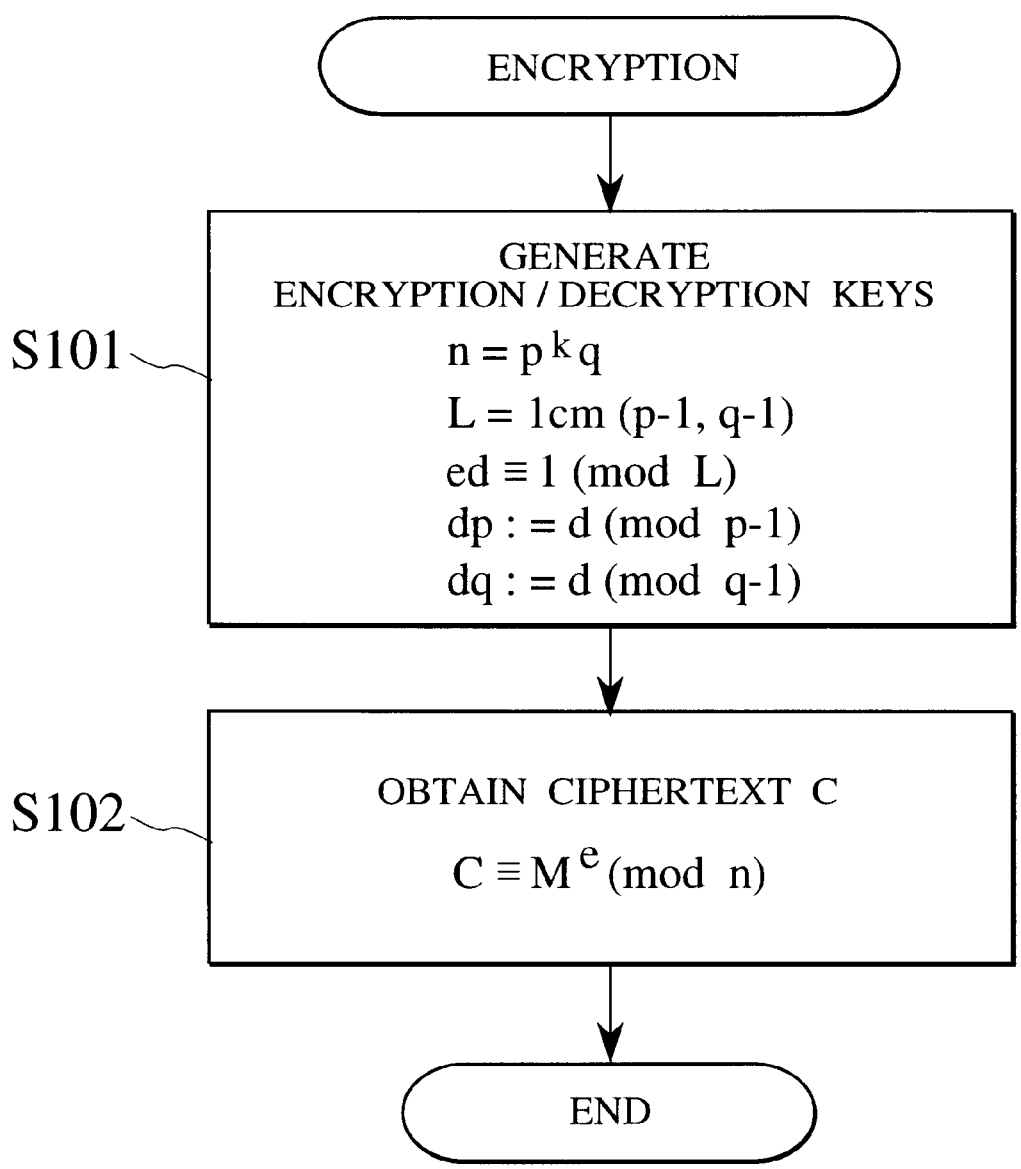
FIG. 2 is a flow chart for an encryption processing of an encryption apparatus in the cipher communication system of FIG. 1.

Next, the operation of the encryption apparatus 10 will be described in detail with reference to FIG. 2.

First, the encryption/decryption keys are generated at the encryption/decryption key generation processing unit 11 as follows (step S101).

Here, the first secret key is to be given by two rational prime numbers p and q, and the first public key is to be given by their product, i.e., $n=p^k q$. Also, using the function lcm for obtaining the least common multiple, L given by:

$$L = lcm(p-1, q-1)$$

is obtained from the first secret key p and q.

Next, e and d that satisfies:

$$ed \equiv 1 \pmod{L}$$

are obtained. Then, the residues $d_p$ and $d_q$ of the obtained d modulo (p−1) and (q−1) respectively are obtained as:

$$d_p := d \pmod{p-1},$$

$$d_q := d \pmod{q-1},$$

where a symbol ":=" denotes the operation to calculate the right hand side and substitute it into the left hand side, and a set of three numbers d, dp and dq is set as the second secret key, while e is set as the second public key. In this way, the first public key n, the second public key e, the first secret key p, q, and the second secret key d, $d_p$ and $d_q$ are set up.

Then, the ciphertext C is obtained at the encryption processing unit 13 as follows (step S102).

The encryption processing unit 13 encrypts the plaintext M by using the first public key n and the second public key e, according to the formula:

$$C \equiv M^e \pmod{n}$$

and transmits the obtained ciphertext C to the receiving side.

Figure 3:
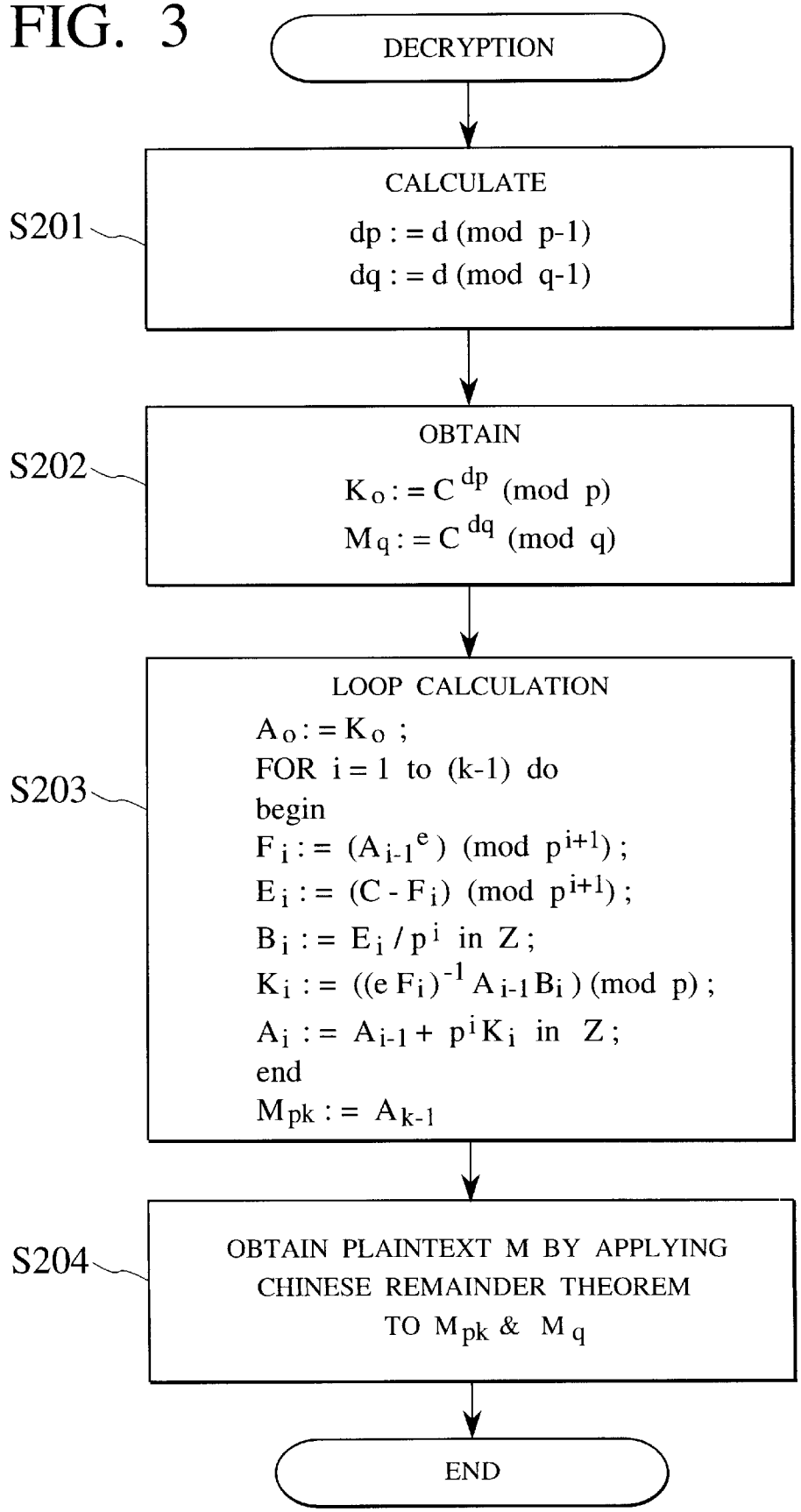
FIG. 3 is a flow chart for a decryption processing of a decryption apparatus in the cipher communication system of FIG. 1.

Next, the operation of the decryption apparatus 19 will be described in detail with reference to FIG. 3.

The decryption processing unit 15 obtains the plaintext M as an output from the ciphertext C entered from the encryption processing unit 13 through the communication path, the first secret key p, q, the second secret key d, the second public key e and the arbitrary positive integer k which are entered from the encryption/decryption key generation processing unit 11, by carrying out the following substitution calculation processing, where a symbol ":=" denotes the operation to calculate the right hand side and substitute it into the left hand side. (Step S201) The values $d_p$ and $d_q$ of the second secret key d modulo p−1 and q−1 respectively are obtained as follows.

$$d_p := d \pmod{p-1},$$

$$d_q := d \pmod{q-1}.$$

Note that there is no need to calculate these d (mod p−1) and d (mod q−1) at every occasion of the encryption/decryption and it suffices to produce them once in advance as the secret key. In such a case, d will be necessary only at the intermediate stage for producing these d (mod p−1) and d (mod q−1).

(Step S202) The residues $K_p$, $M_q$ of the plaintext M modulo p and q respectively are obtained from the ciphertext C as follows.

$$K_{\beta}' := C^{d_p} \pmod{p},$$

$$M_q' := C^{d_q} \pmod{q}.$$

(Step S203) The residue $M_{pk}$ of the plaintext M modulo $p^k$ is obtained by carrying out the following loop calculation according to the fast decryption algorithm disclosed in T. Takagi, "Fast RSA-type cryptosystem using n-adic expansion", Advances in Cryptology—CRYPTO'97, LNCS 1294, pp. 372–384 and in U.S. patent application Ser. No. 08/907,852 of the present inventors, at the loop calculation processing unit 17.

$$A_{\dot{0}} = K_{\dot{0}}$$

FOR $i=1$ to $(k-1)$ do begin $$F_i := (A_{i-1}^e) \pmod{p^{i+1}};$$

$$E_i := (C - F_i) \pmod{p^{i+1}};$$

$$B_i := E_i / p^i \text{ in } Z;$$

$$K_i := ((eF_i)^{-1} A_{i-1} B_i) \pmod{p};$$

$$A_i := A_{i-1} + p^i K_i \text{ in } Z;$$

end $$M_{pk} := A_{k-1}.$$

(Step S204) The residue of the plaintext M with respect to a composite number n is obtained by applying the Chinese remainder theorem to the residues $M_{pk}$ and $M_q$, so as to complete the decryption.

More specifically, the Chinese remainder theorem can be applied by the following calculation.

$$q_1 := q^{-1} \pmod{p^k};$$

$$v_1 := ((M_{pk} - M_q) q_1) \pmod{p^k};$$

$$M := (M_q + q v_1).$$

Alternatively, the Chinese remainder theorem can also be applied by the following calculation.

$$p_1 := (p^k)^{-1} \pmod{q};$$

$$v_1 := ((M_q - M_{pk}) p_1) \pmod{q};$$

$$M := (M_{pk} + p^k v_1).$$

Alternatively, the Chinese remainder theorem can also be applied by the following calculation.

$$p_1 := (p^k)^{-1} \pmod{q};$$

$$q_1 := q^{-1} \pmod{p^k};$$

$$M := (q_1 q M_{pk} + p_1 p^k M_q) \pmod{p^k q}.$$

Next, the functions of the respective processing units in the cipher communication system of FIG. 1 will be described along their processing procedure.

First, as the first stage, at the encryption/decryption key generation processing unit 11, two prime numbers p and q to be the first secret key are generated, and the product $n=p^k q$ of these two prime numbers p and q is obtained as the first public key. Here, k is an arbitrary integer to be selected by accounting for the security level and the processing speed. Also, as can be seen from the formula $n=p^k q$ for the first public key n, the sizes of p and q can be made smaller when k is larger for a constant size (the number of digits, for example) of n, and the prime factoring becomes as much easier (that is, it becomes easier to learn the values of p and q) so that the security level of this cryptosystem becomes lower.

Next, the least common multiple L is calculated from these two prime numbers p and q, and the second pubic key e and the second secret key d are generated according to $ed \equiv 1 (\mod L)$. This calculation of the least common multiple L can be done by first obtaining the greatest common divisor using the extended Euclidean division algorithm and then multiplying the remaining factors to obtain the least common multiple.

Note that the pair of e and d at this point is uniquely determined from $ed \equiv 1 (\mod L)$. Although it can be any pair that satisfies this condition in principle, usually the second public key e is set to be a smaller value in order to make the encryption faster. For this reason, the second secret key d becomes a considerably large number so that the decryption processing becomes slow when the conventional scheme is adopted. Note that the second public key e and the second secret key d are in relationship of inverse numbers modulo L, so that the second secret key d can be obtained if the second public key e and the least common multiple L are known.

Next, as the second stage, at the encryption processing unit 13, the encryption is carried out according to the formula:

$$C \equiv M^e (\mod n)$$

using the second public key e of the receiving side, and the ciphertext C is transmitted to the receiving side.

Then, as the third stage, at the decryption processing unit 15, $M_{p^k} \equiv M (\mod p^k)$ and $M_q \equiv C^{dq} (\mod q)$ are obtained using the aforementioned fast decryption algorithm, and the Chinese remainder theorem is applied to these two numbers. According to the Chinese remainder theorem, when the residues of an unknown number for plural moduli are known, the unknown number (solution) modulo a product of these plural moduli can be obtained uniquely so that M can be recovered.

Now, concrete examples of the encryption according to this embodiment will be described.

First, the exemplary case of k=2 can be summarized as follows.

Public key e=5
Public key n=40270132689707
Secret key d=234982541
Secret key p=34273
Secret key q=34283
Plaintext M=1234567890
Ciphertext C=10229049760163
$A_0 = K_0 = 20157$
$M_q = 2777$
$K_1 = 1748$
$M_p = A_0 + pK_1 = 59929361$
Plaintext M=1234567890

In this case, the value of each one of the first secret key p and q is about $n^{1/(k-1)}$, and the least common multiple L is about $n^{2/(k+1)}$ which is smaller than the RSA cryptosystem so that it can contribute to the realization of the faster encryption/decryption.

More specifically, the calculation time for $C^d \mod n$ is $O((\log n)^2 (\log d))$ while the calculation time for $C^d \mod p$ and $C^d \mod q$ is $O(\frac{1}{3} \log n)^2 (\frac{2}{3} \log n)$. Thus the overall processing time is 0.148 times that of the RSA cryptosystem, and it is a little over three times faster than the Quisquater-Couvreur scheme that utilizes the Chinese remainder theorem (which has the calculation time of $O(\frac{1}{2} \log n)^2 (1 \log n))$.

Next, the exemplary case of k=3 can be summarized as follows.

Public key e=5
Public key n=627252701350243
Secret key d=7515005
Secret key p=5003
Secret key q=5009
Plaintext M=123456789012345
Ciphertext C=287551735059915
$A_0 = K_0 = 1732$
$M_q = 3412$
$K_{1p} = 4821$
$A_1 = 24121195$
$K_{2p} = 4395$
$M_{p^2} = A_2 = A_1 + p^2 K_2 = 110031010750$
Plaintext M=123456789012345

It should be apparent that the encryption/decryption scheme described above is also applicable to the case of using three prime numbers $p_1 = p$, $p_2 = q$ and $p_3 = r$ as the first secret key and a product $p^k q^l r^m$ where k=k1, l=k2 and m=k3 as the first public key n.

In this case, the decryption can be realized by first obtaining $K_0^p$, $K_0^q$ and $K_0^r$ modulo p, q and r, respectively, by integer modular exponent calculations of:

$$K_0^p := C^{dp} (\mod p);$$

$$K_0^q := C^{dq} (\mod q);$$

$$K_0^r := C^{dr} (\mod r);$$

where:

$$dp := d (\mod p-1);$$

$$dq := d (\mod q-1);$$

$$dr := d (\mod r-1);$$

next obtaining the residues $M_{p^k}$, $M_{q^l}$ and $M_{r^m}$ modulo $p^k$, $q^l$ and $r^m$, respectively, by applying the loop calculation to $K_0^p$, $K_0^q$ and $K_0^r$, respectively, and then applying the Chinese remainder theorem to the residues $M_{p^k}$, $M_{q^l}$ and $M_{r^m}$.

It should also be apparent that the encryption/decryption scheme described above can be generalized to the case of using N ($\geq 2$) prime numbers $p_1, p_2, \ldots, p_N$ as a first secret key, and a product $p_1^{k1} p_2^{k2} \ldots p_N^{kN}$ as a first public key n, where k1, k2, ..., kN are arbitrary positive integers, a second public key e and a second secret key d which satisfy:

$$ed \equiv 1 (\mod L)$$

where L is a least common multiple of $p_1-1, p_2-1, \ldots, p_N-1$.

In this general case, a ciphertext C can be obtained from a plaintext M according to:

$$C \equiv M^e (\mod n)$$

using the first public key n and the second public key e defined above.

Also in this case, the decryption can be realized by first obtaining residues $M_{p1k1}, M_{p2k2}, \ldots, M_{pNkN}$ modulo $p_1^{k1}, p_2^{k2}, \ldots, p_N^{kN}$, respectively, of the plaintext M using the loop calculation of the aforementioned fast decryption algorithm with respect to the first secret key $p_1, p_2, \ldots, p_N$, and then applying the Chinese remainder theorem to the residues $M_{p1k1}, M_{p2k2}, \ldots, M_{pNkN}$.

Figure 4:
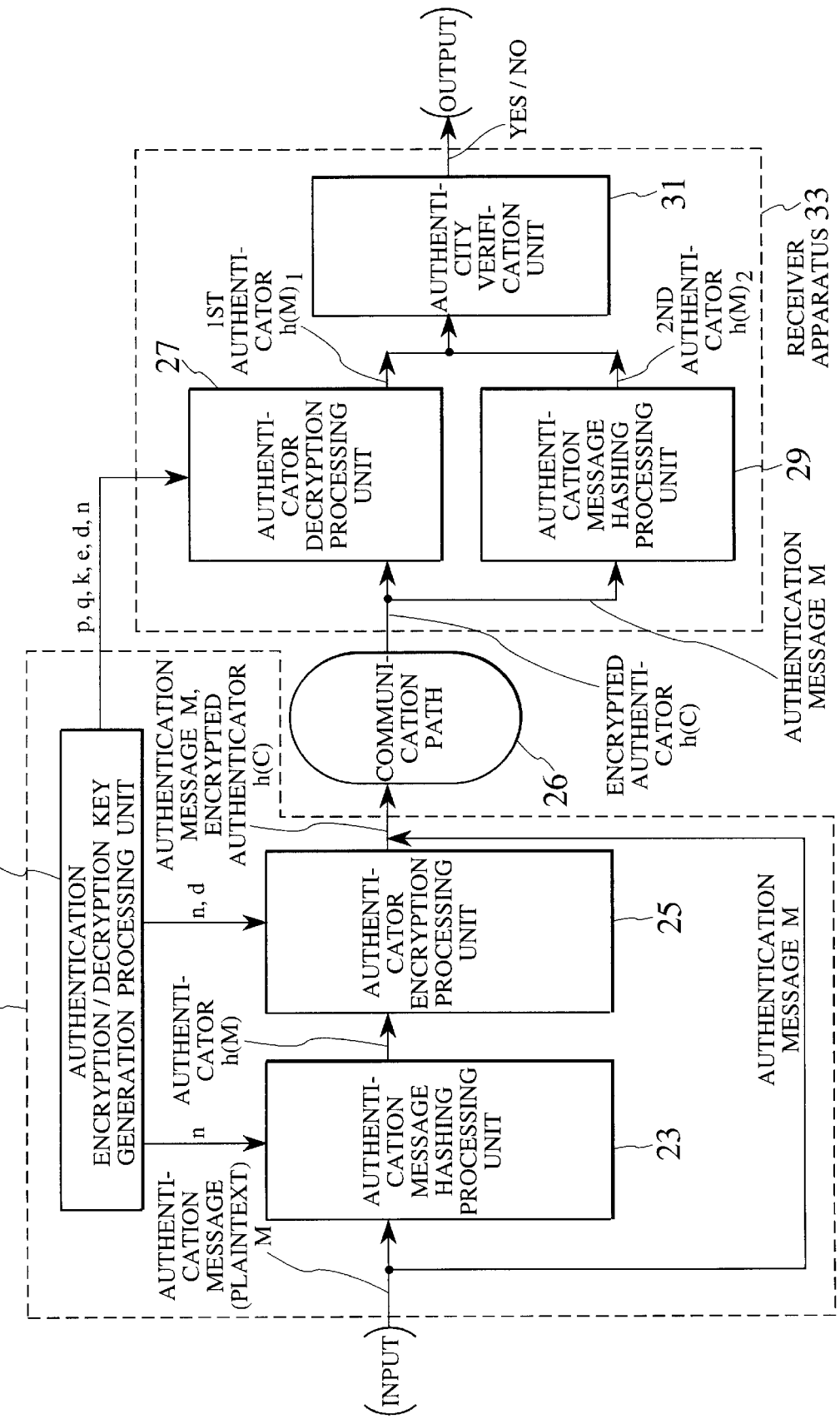
FIG. 4 is a block diagram of an authentication system according to one embodiment of the present invention.

Next, FIG. 4 shows an overall configuration of an authentication system according to one embodiment of the present invention.

The authentication system of FIG. 4 generally comprises a sender apparatus 20 and a receiver apparatus 33 which are connected through a communication path 26. The sender apparatus 20 has an authentication message hashing processing unit 23 for outputting an authenticator h(M) by applying a hashing processing on an input authentication message (plaintext) M, and an authenticator encryption processing unit 25 for encrypting the authenticator h(M) outputted from the authentication message hashing processing unit 23 and transmitting the obtained encrypted authenticator S through a communication path 26.

The receiver apparatus 33 has an authenticator decryption processing unit 27 for obtaining a first authenticator $h(M)_1$ from the encrypted authenticator S and an authentication message hashing processing unit 29 for obtaining a second authenticator $h(M)_2$ from the authentication message M, both of which are connected to the authentication encryption processing unit 25 through the communication path 26, and an authenticity verification processing unit 31 for verifying an authenticity of the authentication message M, which is connected with the authenticator decryption processing unit 27 and the authentication message hashing processing unit 29.

In addition, the sender apparatus 20 also has an authentication encryption/decryption key generation processing unit 21 for outputting authentication encryption/decryption keys to the authenticator encryption processing unit 25 and the authenticator decryption processing unit 27 respectively.

This authentication system of FIG. 4 realizes the authentication scheme in which a person who wishes to have the own authentication message authenticated will send to the receiving side an authenticator generated by encrypting the authentication message by using the own secret key.

Now, the operations of the respective processing units in the authentication system of FIG. 4 will be described along their processing procedure with reference to FIG. 5.

First, as the first stage (step S301), at the authentication encryption/decryption key generation processing unit 21, two prime numbers p and q to be the first secret key are generated, and the product $n=p^k q$ of these two prime numbers p and q is obtained as the first public key. Here, k is an arbitrary integer to be selected by accounting for the security level and the processing speed. Also, as can be seen from the formula $n=p^k q$ for the first public key n, the sizes of p and q can be made smaller when k is larger for a constant size (the number of digits, for example) of n, and the prime factoring becomes as much easier (that is, it becomes easier to learn the values of p and q) so that the security level of this cryptosystem becomes lower. Then, the least common multiple L is calculated from these two prime numbers p and q, and the second pubic key e and the second secret key d are generated according to $ed \equiv 1 \pmod{L}$.

Next, as the second stage (step S302), at the authentication message hashing processing unit 23, the plaintext authentication message M is hashed by using the hash function h to obtain the authenticator h(M), where it is assumed that $0 \leq h(M) < n$. Here, the hash function is used in order to shorten the message length. For example, the hashing processing extracts several characters from the top of the message. Also, a certain level of the scrambling function is to be provided. Note that the same hash function is to be used at the sending side and the receiving side.

Next, as the third stage (step S303), at the authenticator encryption processing unit 25, the encrypted authenticator S is calculated by the technique of the aforementioned fast decryption algorithm, using the first public key n and the second secret key d of the sending side. Note that, in the authentication, the decryption processing and the encryption processing become completely reversed from the case of the encryption/decryption scheme described above, so that the calculation of the encrypted authenticator S can be processed quickly by using the Chinese remainder theorem.

After this calculation processing, the set of the encrypted authenticator S and the authentication message M is transmitted to the receiving side through the communication path.

Next, as the fourth stage (step S304), at the authenticator decryption processing unit 27, the receiving side decrypts the encrypted authenticator S by calculating:

$$h(M)_1 S^e \pmod{n}$$

using the second public key e of the sending side, so as to obtain the first authenticator $h(M)_1$.

Next, as the fifth stage (step S305), at the authentication message hashing processing unit 29, the receiving side hashes the authentication message M by using the hash function h so as to obtain the second authenticator $h(M)_2$.

Then, as the sixth stage (step S306), at the authenticity verification processing unit 31, the authenticity of the authentication message is judged according to whether the first authenticator $h(M)_1$ and the second authenticator $h(M)_2$ coincide with each other or not, and an output indicating either coincide (Yes) or not coincide (No) is outputted.

More specifically, the authentication scheme according to the present invention can be realized as follows.

In the most general case, the sender side sets a first secret key given by N ($\geq 2$) prime numbers $p_1, p_2, \ldots, p_N$, a first public key n given by a product $p_1^{k1} p_2^{k2} \ldots p_N^{kN}$ where k1, k2, ..., kN are arbitrary positive integers, a second public key e and a second secret key d which satisfy:

$$ed \equiv 1 \pmod{L}$$

where L is a least common multiple of $p_1-1, p_2-1, \ldots, p_N-1$.

Then, the sender side obtains an authenticator h(M) by hashing the authentication message M using a hash function h, while obtaining an encrypted authenticator S of the authenticator h(M) according to:

$$h(M) S^e \pmod{n}$$

by obtaining residues $S_{p1k1}, S_{p2k2}, \ldots, S_{pNkN}$ modulo $p_1^{k1}, p_2^{k2}, \ldots, p_N^{kN}$, respectively, of the encrypted authenticator S using the loop calculation of the aforementioned fast decryption algorithm with respect to the first secret key $p_1, p_2, \ldots, p_N$, and applying the Chinese remainder theorem to the residues $S_{p1k1}, S_{p2k2}, \ldots, S_{pNkN}$.

Then, the encrypted authenticator S and the authentication message M are sent from the sender to the receiver.

Next, the receiver side obtains a first authenticator $h(M)_1$ by calculating $S^e \pmod{n}$ from the encrypted authenticator S received from the sender using the second public key e, while obtaining a second authenticator $h(M)_2$ by hashing the authentication message M received from the sender using the hash function h.

Then, an authenticity of the authentication message M is judged at the receiver side by checking whether the first authenticator $h(M)_1$ and the second authenticator $h(M)_2$ coincide or not.

It should be apparent from the above that, in the specific case where the encrypted authenticator S is obtained using the first secret key given by three prime numbers $p_1=p$, $p_2=q$ and $p_3=r$ and the first public key n given by a product $p^k q^l r^m$ where k=k1, l=k2 and m=k3, the sender obtains the encrypted authenticator S by first obtaining $h(K)_0^p$, $h(K)_0^q$ and $h(K)_0^r$ modulo p, q and r, respectively, by integer modular exponent calculations of:

$$h(K)_0^p := h(M)^{dp} (\mathrm{mod}\ p);$$

$$h(K)_0^q := h(M)^{dq} (\mathrm{mod}\ q);$$

$$h(K)_0^r := h(M)^{dr} (\mathrm{mod}\ r);$$

where:

$$dp := d (\mathrm{mod}\ p-1);$$

$$dq := d (\mathrm{mod}\ q-1);$$

$$dr := d (\mathrm{mod}\ r-1);$$

next obtaining the residues $S_{pk}$, $S_{ql}$ and $S_{rm}$ modulo $p^k$, $q^l$ and $r^m$, respectively, by applying the loop calculation to $h(K)_0^p$, $h(K)_0^q$ and $h(K)_0^r$, respectively, and then applying the Chinese remainder theorem to the residues $S_{pk}$, $S_{ql}$ and $S_{rm}$.

It should also be apparent from the above that, in the specific case where the encrypted authenticator S is obtained using the first secret key given by two prime numbers $p_1=p$ and $p_2=q$ and the first public key n given by a product $p^k q$ where k=k1, the sender obtains the encrypted authenticator S by first obtaining a residue $h(K)o$ modulo p and a residue $S_q$ modulo q of the encrypted authenticator S, by integer modular exponent calculations of:

$$h(K)_0 = h(M)^{dp} (\mathrm{mod}\ p);$$

$$S_q := h(M)^{dq} (\mathrm{mod}\ q);$$

where:

$$dp := d (\mathrm{mod}\ p-1);$$

$$dq := d (\mathrm{mod}\ q-1);$$

next obtaining a residue $S_{pk}$ modulo $p^k$ of the encrypted authenticator S by applying the loop calculation to $h(K)_8$, and then applying the Chinese remainder theorem to the residues $S_{pk}$ and $S_q$.

In this case, the loop calculation can be carried out as follows.

$$h(A)_8 := h(K)_8;$$

FOR i=1 to (k-1) do begin $$h(F)_i := (h(A)_{i-1}{}^e)(\mathrm{mod}\ p^{i+1});$$

$$h(E)_i := (h(M) - h(F)_i)(\mathrm{mod}\ p^{i+1});$$

$$h(B)_i := h(E)_i / p^i\ \mathrm{in}\ Z;$$

$$h(K)_i := ((eh(F)_i)^{-1} h(A)_{i-1} h(B)_i)(\mathrm{mod}\ p);$$

$$h(A)_i := h(A)_{i-1} + p^i h(K)_i\ \mathrm{in}\ Z;$$

end $$S_{pk} = h(A)_{k-1}.$$

Also in this case, the Chinese remainder theorem can be applied by the following calculation.

$$q_1 := q^{-1} (\mathrm{mod}\ p^k);$$

$$v_1 := ((S_{pk} - S_q) q_1)(\mathrm{mod}\ p^k);$$

$$S := (S_q + q v_1).$$

Alternatively, the Chinese remainder theorem can also be applied by the following calculation.

$$p_1 := (p^k)^{-1} (\mathrm{mod}\ q);$$

$$v_1 := ((S_q - S_{pk}) p_1)(\mathrm{mod}\ q);$$

$$S := (S_{pk} + p^k v_1).$$

Alternatively, the Chinese remainder theorem can also be applied by the following calculation.

$$p_1 := (p^k)^{-1} (\mathrm{mod}\ q);$$

$$q_1 := q^{-1} (\mathrm{mod}\ p^k);$$

$$S := (q_1 q S_{pk} + p_1 p^k S_q)(\mathrm{mod}\ p^k q).$$

Note that, in the above described embodiment, each of the prime numbers has a size of about $n^{1/(k+1)}$ which is sufficient to prevent the number field sieve method and the elliptic curve method that are the fastest prime factoring algorithms currently known. Also, the second public key e can be set small so that the second secret key d has about the same size as the least common multiple L. Here, the least common multiple L has a size of $n^{2/(k-1)}$ which is smaller than that of the RSA cryptosystem so that it can contribute to the realization of the faster encryption/decryption.

Also, in the above described embodiment, the case of k=3 uses the composite number $n=p^3 q$ as the modulus, so that the size of each of p and q becomes ¼ of the size of n. The decryption processing modulo $p^3$ requires about the same amount of calculations as the processing modulo p, so that the processing modulo $p^3$ and the processing modulo q can be made 64 times faster. Thus the overall processing can be made 32 times faster, which is considerably faster even in comparison with the conventional Quisquater-Couvreur scheme that can realize four times faster decryption processing than the original RSA cryptosystem.

As described, the cryptosystem according to the present invention uses N ($\geq$2) prime numbers $p_1, p_2, \ldots, p_N$ as the first secret key and their product $p_1^{k1} p_2^{k2} \ldots p_N^{kN}$ as the first public key n, so that it has the same security level as the conventionally known RSA cryptosystem on rational integer ring, while it is capable of realizing the faster encryption and decryption processing. In addition, it can be utilized for the authentication as well, and it is also capable of realizing the faster authenticator generation and authenticity verification.

Moreover, the cryptosystem according to the present invention uses the second public key e as an encryption key and the second secret key d as a decryption key which satisfy:

$$ed \equiv 1 (\mathrm{mod}\ L)$$

where L is a least common multiple of $p_1-1, p_2-1, \ldots, p_N-1$, so that the size of the decryption key d can be made about the same as the size of L.

In contrast, in the case of the RSA cryptosystem for example, if $p_1^{k1} p_2^{k2} \ldots p_N^{kN}$ is to be used as the first public key n where $p_1, p_2, \ldots, p_N$ are N ($\geq 2$) prime numbers, it is required to generate the encryption key e and the decryption key d which satisfy:

$$ed \equiv 1 (\bmod \; \phi(n))$$

where $$\phi(n) = n(1-1/p_1)(1-1/p_2) \ldots (1-1/p_N)$$

is the Euler function, so that the size of the decryption key d becomes the same as the size of $\phi(n)$ which is considerably larger than the size of L.

It is to be noted that the above described embodiment according to the present invention may be conveniently implemented in forms of software programs for realizing the operations of the cipher communication system of FIG. 1 or the authentication system of FIG. 4, as will be apparent to those skilled in the computer art. Appropriate software coding can readily be prepared by skilled programmers based on the teachings of the present disclosure, as will be apparent to those skilled in the software art.

In particular, each of the encryption apparatus and the decryption apparatus of FIG. 1 and the sender apparatus and the receiver apparatus of FIG. 4 as described above can be conveniently implemented in a form of a software package.

Such a software package can be provided in a form of a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A decryption method for decrypting a ciphertext C obtained from a plaintext M according to:

$$C \equiv M^e (\bmod \; n)$$

Using a first secret key given by $N(\geq 2)$ prime numbers $p_1$, $p_2$, a first public key n given by a product $p_1^{k1} p_2^{k2} \ldots p_N^{kN}$ where k1, k2, . . . , kN are arbitrary positive integers, a second public key e and a second secret key d which satisfy:

$$ed \equiv 1 (\bmod \; L)$$

where L is a least common multiple of $p_1-1$, $p_2-1$, . . . , $p_N-1$, the method comprising the steps of:
  obtaining residues $M_{p1k1}$, $M_{p2k2}$, . . . , $M_{pNkN}$ modulo $p_1^{k1} p_2^{k2} \ldots p_N^{kN}$, respectively, of the plaintext M using a prescribed loop calculation with respect to the first secret key $p_1, p_2, \ldots, p_N$; and
  recovering the plaintext M by applying Chinese remainder theorem to the residues $M_{p1k1}$, $M_{p2k2}$, . . . , $M_{pNkN}$;
  wherein the ciphertext C is obtained using the first secret key given by two prime numbers $p_1 = p$ and $p_2 = q$ and the first public key n given by a product $p^k q$ where k=k1;

the obtaining step obtains a residue $k_\emptyset$ modulo p and a residue $M_q$ modulo q of the plaintext M, by integer modular exponent calculations of:

$$k_\emptyset := C^{dp} (\bmod \; p);$$

and $$M_q := C^{dp} (\bmod \; q);$$

where:

$$dp := d (\bmod \; p-1);$$

and $$dq := d (\bmod \; q-1);$$

and obtains a residue $M_{pk}$ and $M_q$; and
  wherein the prescribed loop calculation is carried out by:
    (a) setting $A_\emptyset := K_\emptyset$;
    (b) for i=1 to (k-1), repeatedly calculating:
      $F_i := (A_{i-1}^e) (\bmod \; p^{1-i})$;
      $E_i := (C-F_i) (\bmod \; p^{1-i})$;
      $B_i := E_1/p^1$ in Z;
      $K_i := ((eF_{1i})-1A_{i-1}B_i) (\bmod \; p)$;
      $A_i := A_{1-1+}p^i$ in Z; and
    (c) setting $M_{pk} := A_{k-1}$.

2. The method of claim 1, wherein the recovering step recovers the plaintext M by calculating:

$$q_1 := q^{-1} (\bmod \; p^k);$$

$$v_1 := ((M_{pk} - M_q) q_1)(\bmod \; p^k);$$

and $$M := (M_q q v_1).$$

3. The method of claim 1, wherein the recovering step recovers the plaintext M by calculating:

$$p_1 := (p^b)^{-1} (\bmod \; q);$$

$$v1 := ((M_q - M_{pk}) p_1)(\bmod \; q);$$

and $$M := (_{pk} + p^k v_1).$$

4. The method of claim 1, wherein the recovering step recovers the plaintext M by calculating:

$$p_1 := (p^k)^{-1} (\bmod \; q);$$

$$q_1 := q^{-1} (\bmod \; p^k);$$

and $$M := (q_1 q M_{pk} + p_1 p^k M_q)(\bmod \; p^k q).$$

5. An authentication method for authenticating an authentication message sent from a sender to a receiver, comprising the steps of:
  (a) setting at the sender side a first secret key given by $N(\geq 2)$ prime numbers $p_1, p_2, \ldots, p_N$, a first public key n given by a product $p_1^{k1} p_2^{k2} \ldots P_N^{kN}$ where k1, k2, . . . kN are arbitrary positive integers; a second public key e and a second secret key d which satisfy:

$$ed \equiv 1 (\bmod \; L)$$

where L is a least common multiple of $p_1-1$, $p_2-1$, . . . , $p_N-1$;

(b) obtaining at the sender side an authenticator h(M) by hashing the authentication message M using a hash function h;

(c) obtaining at the sender side an encrypted authenticator h(C) of the authenticator h(M) according to:

$$h(M) \equiv h(C)^e \pmod{n}$$

by obtaining residues $h(C)_{p1k1}$, $h(C)_{p2k2}$, ..., $h(C)_{pNkN}$ modulo $p_1^{k1} p_2^{k2} \ldots, P_N^{kN}$, respectively, of the encrypted authenticator h(C) using a prescribed loop calculation with respect to the first secret key $p_1, p_2, \ldots, P_N$, and applying Chinese remainder theorem to the residues $h(C)_{p1k1}$, $h(C)_{p2k2}, \ldots, h(C)_{pNkn}$;

(d) sending the encrypted authenticator h(C) and the authentication message M from the sender to the receiver;

(e) obtaining at the receiver side a first authenticator $h(M)_1$ by calculating $h(C)^e \pmod{n}$ from the encrypted authenticator h(C) received from the sender using the second public key e;

(f) obtaining at the receiver side a second authenticator $h(M)_2$ by hashing the authentication message M received from the sender using the hash function h; and (g) judging an authenticity of the authentication message M at the receiver side by checking whether the first authenticator $h(M)_1$ and the second authenticator $h(M)_2$ coincide or not;

wherein the encrypted authenticator h(C) is obtained using the first secret key given by two prime numbers $p_1 = p$ and $p_2 = q$ and the first public key n given by a product $p^k q$ where k=k1;

the step (c) obtains a residue $h(K)_\emptyset$ modulo p and a residue $h(C)_q$ modulo q of the encrypted authenticator h(C), by integer modular exponent calculations of:

$$h(K)_\emptyset := h(M)^{dq} \pmod{p};$$

and $$h(C)_q := h(M)^{dq} \pmod{q};$$

where:

$$dp := d \pmod{p-1};$$

and $$dq := d \pmod{q-1};$$

and obtains a residue $h(C)_{p^k}$ modulo $p^k$ of the encrypted authenticator h(C) by applying the prescribed loop calculation to $h(K)_\emptyset$; and wherein the prescribed loop calculation is carried out by:
(a) setting $h(A)_\emptyset := h(K)_\emptyset$;
(b) for i=1 to (k-1), repeatedly calculating:
$h(F)_i := (h(A)_{i-1}^\emptyset) \pmod{p^{i+1}}$;
$h(E)_i := (h(M) - h(F)_1) \pmod{p^{i+1}}$;
$h(B)_i := ((eh(F)_1)^{-1} h(A)_{i-1} h(B)_1) \pmod{p}$;
$h(K)_i := h(A)_{i-1} + p^1 h(K)_i$ in Z; and
(c) setting $h(C)_{pk} := h(A)_{k-1}$.

6. The method of claim 5, wherein the step (c) applies the Chinese remainder theorem by calculating:

$$q_1 := q^{-1} \pmod{p^k};$$

$$v_1 := (S_{pk} - S_q) q_1 \pmod{p^k};$$

and $$S:(S_q + qv_1).$$

7. The method of claim 5, wherein the step (c) applies the Chinese remainder theorem by calculating:

$$p_1 := (p^k)^{-1} \pmod{q};$$

$$v_1 := (S_q - S_{pk}) p_1 \pmod{q};$$

and $$S := (S_{pk} + p^k v_1).$$

8. The method of claim 5, wherein the step (c) applies the Chinese remainder theorem by calculating:

$$p_1 := (p^k)^{-1} \pmod{q};$$

$$q_1 := q^{-1} \pmod{p^k};$$

and $$S := q_1 q S_{pk} + p_1 p^k S_q \pmod{p^k q}.$$

9. A decryption apparatus for decrypting a ciphertext C obtained from a plaintext M according to:

$$C \equiv M^e \pmod{n}$$

using a first secret key given by N ($\geq 2$) prime numbers p1, p2, ..., $p_N$, a first public key n given by a product $p_1^{k1} p_2^{k2} \ldots p_N^{kN}$ where k1, k2, ..., kN are arbitrary positive integers and kj $\geq 2$ for at least one j ($1 \leq j \leq N$), a second public key e and a second secret key d which satisfy:

$$ed \equiv 1 \pmod{L}$$

where L is a least common multiple of $p_1 - 1, p_2 - 1, \ldots, p_N - 1$, the apparatus comprising:

a calculation processing unit for obtaining residues $M_{p1k1}$, $M_{p2k2}, \ldots, M_{pNkN}$ modulo $p_1^{k1}, p_2^{k2}, \ldots, p_N^{kN}$, respectively, of the plaintext M using a prescribed loop calculation with respect to the first secret key $p_1$, $p_2 \ldots, p_N$; and a decryption processing unit for recovering the plaintext M by applying Chinese remainder theorem to the residues $M_{p1k1}, M_{p2k2}, \ldots, M_{pNkN}$;

wherein the ciphertext C is obtained using the first secret key given by two prime numbers $p := p$ and $p_2 = q$ and the first public key n given by a product $p^k q$ where k=k1;

the calculation processing unit obtains a residue $K_\emptyset$ modulo p and a residue $M_q$ modulo q of the plaintext M, by integer modular exponent calculations of:

$$K_{527} := C^{dp} \pmod{p};$$

and $$M_q := C^{dq} \pmod{q};$$

where:

$$dq := d \pmod{p-1};$$

and $$dq := d \pmod{q-1};$$

and obtains a residue $M_{p^k}$ modulo $p^k$ of the plaintext M by applying the prescribed loop calculation to $K_\emptyset$;

the decryption processing unit applies the Chinese remainder theorem to the residues $M_{pk}$ and $M_q$; and the prescribed loop calculation is carried out by:
(a) setting $A_\emptyset := K_\emptyset$;
(b) for i=1 to (k−1), repeatedly calculating:
$F_i := (A_{i-1}{}^e)$ (mod $p^{i+1}$);
$E_i := (C−F_i)$ (mod $p^{i+1}$);
$B_i := E_i/p^i$ in Z;
$K_i := ((eF_i{}^{-1}) A_{1-1} Bi)$ (mod p);
$A_i := A_{i-1} + p^1 K_i$ in Z; and
(c) setting $M_{pk} := A_{k-1}$.

10. A cipher communication system, comprising: a sender apparatus having:

an encryption/decryption key generation processing unit for setting N ($\geq 2$) prime numbers $p_1, p_2, \ldots, p_N$ as a first secret key, and a product $p_1^{k1} p_2^{k2} \ldots p_N^{kN}$ as a first public key n, where k1, k2, ... kN are arbitrary positive integers and kj$\geq$2 for at least one j ($1 \leq j \leq N$), and determining a second public key e and a second secret key d which satisfy:

$$ed \equiv 1 (\bmod L)$$

where L is a least common multiple of $p_1-1, p_2-1, \ldots, p_N-1$, using the first secret key; and an encryption processing unit for obtaining a ciphertext C from a plaintext M according to:

$$C \equiv M^e (\bmod n)$$

using the first public key n and the second public key e; and a receiver apparatus having:

a calculation processing unit for obtaining residues $M_{p1k1}, M_{p2k2}, \ldots, M_{pNkN}$ modulo $p_1^{k1}, p_2^{k2}, \ldots, p_N^{kN}$, respectively, of the plaintext M using a prescribed loop calculation with respect to the first secret key $p_1, p_2, \ldots, p_N$; and a decryption processing unit for recovering the plaintext M by applying Chinese remainder theorem to the residues $M_{p1k1}, M_{p2k2}, \ldots, M_{pNkN}$, wherein the ciphertext C is obtained using the first secret key given by two prime numbers $p_1=p$ and $p_2=q$ and the first public key n given by a product $q^k q$ where k=k1;

the calculation processing unit obtains a residue $k_\emptyset$ modulo p and a residue $M_q$ modulo q of the plaintext M, by integer modular exponent calculations of:

$$k_\emptyset := C^{dp} (\bmod p);$$

and $$M_q := C^{dP} (\bmod p);$$

where:

$$dp := d (\bmod p-1);$$

and $$dq := d (\bmod q-1);$$

and obtains a residue $M_{pk}$ modulo $p^k$ of the plaintext M by applying the prescribed loop calculation to $K_\emptyset$:

the decryption processing unit applies the Chinese remainder theorem to the residues $M_{pk}$ and $M_q$; and the prescribed loop calculation is carried out by:
(a) setting $A_\emptyset := K_\emptyset$;
(b) for i=1 to (k−1), repeatedly calculating:
$F_i := (A_{i-1}{}^e)$ (mod $p^{i+1}$);
$E_i := (C−F_i)$ (mod $p^{i+1}$);
$B_i := E_i/p^i$ in Z;
$K_i := ((eF_i)^{-1} A_{i-1} B1^B{}_i)$ (mod p);
$A_k := A_{1-1} + p^i K_i$ in Z; and
(c) setting $M_{pk} := A_{k-1}$.

11. An authentication message sender apparatus for use in authenticating an authentication message sent from a sender to a receiver, the apparatus comprising:

an encryption/decryption key generation processing unit for setting at the sender side a first secret key given by N ($\geq 2$) prime numbers $p_1, p_2, \ldots, p_N$, a first public key n given by a product $p_1^{k1} p_2^{k2} \ldots p_N^{kN}$ where k1, k2, ... kN are arbitrary positive integers and kj$\geq$2 for at least one j ($1 \leq j \leq N$), a second public key e and a second secret key d which satisfy:

$$ed \equiv 1 (\bmod L)$$

where L is a least common multiple of $p_1-1, p_2-1, \ldots, p_N-1$;

an authentication message hashing processing unit for obtaining at the sender side an authenticator h(M) by hashing the authentication message M using a hash function h; and an authenticator encryption processing unit for obtaining at the sender side an encrypted authenticator S of the authenticator h(M) according to:

$$h(M) \equiv S^e (\bmod n)$$

by obtaining residues $S_{p1k1}, S_{p2k2}, \ldots, S_{pNkN}$ modulo $p_1^{k1}, p_2^{k2}, \ldots, p_N^{kN}$, respectively, of the encrypted authenticator S using a prescribed loop calculation with respect to the first secret key $p_1, p_2, \ldots, p_N$, and applying Chinese remainder theorem to the residues $S_{p1k1}, S_{p2k2}, \ldots, S_{pNkN}$, and then sending the encrypted authenticator S and the authentication message M to the receiver;

wherein the encrypted authenticator S is obtained using the first secret key given by two prime numbers $p_1=p$ and $p_2=q$ and the first public key n given by a product $p^k q$ where k=k1;

the authentication encryption processing unit obtains a residue $h(K)_\emptyset$ modulo p and a residue $S_q$ modulo q of the encrypted authenticator S, by integer modular exponent calculations of:

$$h(K)_\emptyset := h(M)^{dp} (\bmod p);$$

and $$S_q := h(M)^{dq} (\bmod q);$$

where:

$$dp := d (\bmod p-1);$$

and $$dq := d (\bmod q-1);$$

and obtains a residue $S_{pk}$ modulo $p^k$ of the encrypted authenticator S by applying the prescribed loop calculation to $h(K)_\emptyset$, and applies the Chinese remainder theorem to the residues $S_{pk}$ and $S_q$; and the prescribed loop calculation is carried out by:
(a) setting $h(A)_\emptyset := h(K)_\emptyset$;
(b) for i=1 to (k−1), repeatedly calculating:
$h(F)_i := (h(A)_{i-1}{}^e) \pmod{p^{i+1}}$;
$h(E)_i := (h(M) - h(F)_i) \pmod{p^{i+1}}$;
$h(B)_i := h(E)_i / p^i$ in Z;
$h(K)_i := ((eh(F)_i)^{-1} h(A)_{i-1} h(B)_i) \pmod p$;
$h(A)_{1-1} + p^i h(K)_i$ in Z; and
(c) setting $S_{pk} := h(A)_{k-1}$.

12. An authentication system for authenticating an authentication message sent from a sender to a receiver, the system comprising: a sender apparatus having an encryption/decryption key generation processing unit for setting at the sender side a first secret key given by N ($\geq 2$) prime numbers $p_1, p_2, \ldots, p_N$, a first public key n given by a product $p_1^{k1} p_2^{k2} \ldots p_N^{kN}$ where k1, k2, ..., kN are arbitrary positive integers and $kj \geq 2$ for at least one j ($1 \leq j \leq N$), a second public key e and a second secret key d which satisfy:

$$ed \equiv 1 \pmod L$$

where L is a least common multiple of $p_1-1, p_2-1, \ldots, p_N-1$;

an authentication message hashing processing unit for obtaining at the sender side an authenticator h(M) by hashing the authentication message M using a hash function h; and an authenticator encryption processing unit for obtaining at the sender side an encrypted authenticator S of the authenticator h(M) according to:

$$h(M) \equiv S^e \pmod n$$

by obtaining residues $S_{P1k1}, S_{P2k2}, \ldots, S_{pNkN}$ modulo $p_1^1, p_2^{k2}, \ldots, p_N^{kN}$, respectively, of the encrypted authenticator S using a prescribed loop calculation with respect to the first secret key $p_1, p_2, \ldots, p_N$, and applying Chinese remainder theorem to the residues $S_{p1k1}, S_{p2k2}, \ldots, S_{pNkN}$, and then sending the encrypted authenticator S and the authentication message M to the receiver; and a receiver apparatus having;
an authenticator decryption processing unit for obtaining a first authenticator $h(M)_1$ by calculating $S^e$ (mod n) from the encrypted authenticator S received from the sender using the second public key e;

an authenticator message hashing processing unit for obtaining a second authenticator $h(M)_2$ by hashing the authentication message M received from the sender using the hash function h; and an authenticity verification processing unit for judging an authenticity of the authentication message M by checking whether the first authenticator $h(M)_1$ and the second authenticator $h(M)_2$ coincide or not;

wherein the encrypted authenticator S is obtained using the first secret key given by two prime numbers $p_1=p$ and $p_2=q$ and the first public key n given by a product $p^k q$ where k=k1;

the authentication encryption processing unit obtains a residue $h(K)_\emptyset$ modulo p and a residue $S_q$ modulo q of the encrypted authenticator S, by integer modular exponent calculations of:

$$h(K)_\emptyset := h(M)^{dp} \pmod p;$$

and $$S_q := h(M)^{dq} \pmod q;$$

where:

$$dp := d \pmod{p-1};$$

and $$dq := d \pmod{q-1};$$

and obtains a residue $S_{pk}$ modulo $p^k$ of the encrypted authenticator S by applying the prescribed loop calculation to $h(K)_\emptyset$, and applies the Chinese remainder theorem to the residues $S_{pk}$ and $S_q$; and the prescribed loop calculation is carried out by:
(a) setting $h(A)_\emptyset := h(K)_\emptyset$;
(b) for i=1 to (k−1), repeatedly calculating:
$h(F)_i := (h(A)_{i-1}{}^e) \pmod{p^{i+1}}$;
$h(E)_i := (h(M) - h(F)_1) \pmod{p^{1+1}}$;
$h(B)_i := h(E)_i / P_i$ in Z;
$h(K)_i := h(A)_{i-1} + P^i h(K)_i$ in Z;
$h(K)_i := h(A)_{i-1} + P^i h(K)_i$ in Z; and
(c) setting $S_{pk} := h(A)_{k-1}$.

13. A computer usable medium having computer readable program code means embodied therein for causing a computer to function as a decryption apparatus for decrypting a ciphertext C obtained from a plaintext M according to:

$$C \equiv M^e \pmod n$$

using a first secret key given by N ($\geq 2$) prime numbers $P^2, P^2, \ldots, P^N$, a first public key n given by a product $p_1^{k1}, p_2^{k2}, \ldots, p_N^{kN}$ where k1, k2, ..., are arbitrary positive integers and $kj \geq 2$ for at least one j ($1 \leq j \leq N$), a second public key e and a second secret key d which satisfy;

$$ed \equiv 1 \pmod L$$

where L is a least common multiple of $p_1-1, p_2-1, \ldots, p_N-1$, the computer readable program code means includes:

first computer readable program code means for causing said computer to obtain residues $M_{p1k1}, M_{p2k2}, \ldots, M_{pNkN}$ modulo $p_1^{k1}, p_2^{k2}, \ldots p_N^{kN}$, respectively, of the plaintext M using a prescribed loop calculation with respect to the first secret key $p_1, p_2, \ldots, p_N$; and second computer readable program code means for causing said computer to recover the plaintext M by applying Chinese remainder theorem to the residues $M_{p1k1}, M_{p2k2}, \ldots, M_{pNkN}$;

wherein the ciphertext C is obtained using the first secret key given by two prime numbers $p_1=p$ and $p_2=q$ and the first public key n given by a product $p^k q$ where k=k1;

the first computer readable program code means obtains a residue $k_\emptyset$ modulo p and a residue $M_q$ modulo q of the plaintext M, by integer modular exponent calculations of:

$$k_\emptyset := C^{dp} \pmod p;$$

and $$M_q := C^{dp} \pmod q;$$

where:

$$dp := d \pmod{p-1};$$

and $$dq := d \pmod{q-1};$$

and obtains a residue $M_{pk}$ and $M_q$ of the plaintext M y applying the prescribed loop calculation to $K_\emptyset$; the second computer readable program code means applies the Chinese remainder theorem to the residues $M_{pk}$ and $M_q$; and the prescribed loop calculation is carried out by:
(a) setting $A_\emptyset := K_\emptyset$;
(b) for i=1 to (k−1), repeatedly calculating:
$F_i := (A_{1-i}{}^e)$ (mod $p^{1+1}$);
$E_i := (C - F_i)$ (mod $p^{1+1}$);
$B_i := E_i / p^i$ in Z;
$K_i := ((eF_i)^{-1} A_{1-1} Bi)$ (mod p);
$A_k := A_{i-1} + p^i K_i$ in Z; and
(c) setting $M_{pk} := A_{k-1}$.

14. A computer usable medium having computer readable program code means embodied therein for causing a computer to function as an authentication message sender apparatus for use in authenticating an authentication message sent from a sender to a receiver, the computer readable program code means includes:

first computer readable program code means for causing said computer to set at the sender side a first secret key given by N ($\geq 2$) prime numbers $p_1, p_2, \ldots, p_N$, a first public key n given by a product $p_1^{k1} p_2^{k2} \ldots, p_N^{kN}$ where k1, k2, ..., kN are arbitrary positive integers and kj$\geq 2$ for at least one j ($1 \leq j \leq N$), a second public key e and a second secret key d which satisfy:

$$ed \equiv 1 (\bmod L)$$

where L is a least common multiple of $p_1 - 1, p_2 - 1, \ldots, p_N - 1$;

second computer readable program code means for causing said computer to obtain at the sender side an authenticator h(M) by hashing the authentication message M using a hash function h; and third computer readable program code means for causing said computer to obtain at the sender side an encrypted authenticator S of the authenticator h(M) according to:

$$h(M) \equiv S^e (\bmod n)$$

by obtaining residues $S_{p1k1}, S_{p2k2}, \ldots, S_{pNkN}$ modulo $p_1^{k1}, p_2^{k2}, \ldots, p_N^{kN}$ respectively, of the encrypted authenticator S using a prescribed loop calculation with respect to the first secret key $p_1, p_2, \ldots, p_N$, and applying Chinese remainder theorem to the residues $S_{p1k1}, S_{p2k2}, \ldots, S_{pNkN}$, and then sending the encrypted authenticator S and the authentication message M to the receiver;

wherein the encrypted authenticator S is obtained using the first secret key given by two prime numbers $p_1 = p$ and $p_2 = q$ and the first public key n given by a product $p^k q$ where k=k1;

the third computer readable program code means obtains a residue $h(K)_\emptyset$ modulo p and a residue $S_q$ modulo q of the encrypted authenticator S, by integer modular exponent calculations of:

$$h(K)_\emptyset := h(M)^{dp} (\bmod p;$$

and $$S_q := h(M)^{dq} (\bmod q);$$

where:

$$dp := d (\bmod p-1);$$

and $$dq := d (\bmod q-1);$$

and obtains a residue $S_{pk}$ modulo $p^k$ of the encrypted authenticator S by applying the prescribed loop calculation to $h(K)_\emptyset$, and applies the Chinese remainder theorem to the residues $S_{pk}$ and $S_q$; and the prescribed loop calculation is carried out by:
(a) setting $h(A)_\emptyset := h(K)_\emptyset$;
(b) for i=1 to (k−1), repeatedly calculating:
$h(F)_i := (h(A)_{i-1}{}^e)$ (mod $p^{i+1}$);
$h(E)_i := (h(M) - h)(F)_i)$ (mod $p^{i+1}$);
$h(B)_i := h(E)_i / P^i$ in Z;
$h(K)_i := ((eh(F)_i)^{-1} h(A)_{i-1} h(B)_i)$ (mod p);
$h(A)_i := h(A)_{i-1} + p^1 h(K)_i$ in Z; and
(c) setting $S_{pk} := h(A)_{k-1}$.

\* \* \* \* \*